United States Patent
Bieri

[11] Patent Number: 5,186,157
[45] Date of Patent: Feb. 16, 1993

[54] GUIDE AND SUPPORT STRUCTURE FOR SURFACE CUTTING APPARATUS

[75] Inventor: Hans Bieri, Pfäffikon, Switzerland

[73] Assignee: Hydrostress AG, Pfäffikon, Switzerland

[21] Appl. No.: 822,434

[22] Filed: Jan. 17, 1992

[30] Foreign Application Priority Data

Jan. 28, 1991 [CH] Switzerland .............. 00247/91

[51] Int. Cl.$^5$ .................... B28D 1/04; B24B 41/00
[52] U.S. Cl. .................... 125/14; 125/13.01; 51/166 TS
[58] Field of Search .......... 125/12, 13.01, 14; 51/166 TS, 166 FB; 269/243, 268

[56] References Cited

U.S. PATENT DOCUMENTS

| | | | |
|---|---|---|---|
| 2,971,756 | 2/1961 | Debs | 269/243 |
| 4,002,328 | 1/1977 | Wolf | 269/243 |
| 4,134,459 | 1/1979 | Hotchen | 125/14 |
| 4,211,393 | 7/1980 | Olivant | 269/268 |
| 4,489,924 | 12/1984 | McDougal | 269/23 |
| 4,557,245 | 12/1985 | Bieri | 125/14 |
| 4,949,700 | 8/1990 | Ebashi | 125/13.01 |
| 4,989,372 | 2/1991 | Avila | 125/13.01 |

FOREIGN PATENT DOCUMENTS

| | | | |
|---|---|---|---|
| 48449 | 9/1889 | Fed. Rep. of Germany | 269/243 |
| 2028814 | 2/1970 | Fed. Rep. of Germany | 51/166 TS |
| 3423390 | 1/1986 | Fed. Rep. of Germany | |
| 8901845 | 3/1989 | Fed. Rep. of Germany | |
| 355354 | 12/1937 | Italy | 269/243 |
| 460926 | of 1951 | Italy | 269/243 |
| 49006 | 6/1990 | Japan | 125/12 |
| 179588 | of 1962 | U.S.S.R. | 51/166 TS |

Primary Examiner—Bruce M. Kisliuk
Assistant Examiner—Bo Bounkong
Attorney, Agent, or Firm—Frishauf, Holtz, Goodman & Woodward

[57] ABSTRACT

A rotary cutter saw apparatus (C, B) is movable along an elongated rail element (1). To permit continuous selected longitudinal adjustment of support blocks (8, 34) with respect to a base support suface (S) along the length of elongated rail element (1), an attachment base is formed on the rail element which interfits with a projection-and-recess fit with a portion of the support block. A clamping arrangement (7) can clamp the interengaging projection-and-recess portions together; preferably, they form a dovetail connection, with a movable clamping jaw which clamps both against the attachment base and the support block structure. The support block may include a plate (10), adjustably positioned over the surface by adjustment screw bolts, or a rod or tube element (35), so that the rail element (1) and the cutter element thereon, can also be tilted about the axis of the rod or tube element.

12 Claims, 2 Drawing Sheets

GUIDE AND SUPPORT STRUCTURE FOR SURFACE CUTTING APPARATUS

Reference to related patent, the disclosure of which is hereby incorporated by reference:
U.S. Pat. No. 4,557,245, Bieri.

FIELD OF THE INVENTION

The present invention relates to a support and guide structure system for an apparatus to cut grooves or slicing cuts into a surface, for example a ground surface, a wall surface and the like, and more particularly to a support structure for such apparatus, which is especially adapted for selective adjustment with respect to uneven base surfaces to provide, overall, a guide rail system on which a rotary cutter apparatus can ride.

BACKGROUND

The referenced U.S. Pat. No. 4,557,245 describes a guide system for saws and the like suitable for cutting concrete, typically concrete or similar hard road surfaces, wall surfaces and the like, for example to provide elongated cuts to permit, subsequently, removal of concrete between the cuts, for example to relocate or repair telephone lines or or other subterranean connections or conduits. The referenced patent describes such a guide rail in which support blocks are provided which engage in openings of an elongated guide rail. This is an excellent connection between the guide rail and the support blocks. The support blocks, typically, rest on or are secured to the surface to be cut.

In actual practice, it has been found that if the base surfaces are uneven, it is not possible to move the support blocks to the most convenient or best support location; they cannot be readjusted, continuously and at random, longitudinally of the guide rail, but can only be relocated wherever the openings in the guide rails have been formed. It is only possible to reposition the support blocks after lifting off a guide rail element, so that the support blocks can be, then relocated in accordance with engagement openings.

THE INVENTION

It is an object to improve the general structure of the aforementioned U.S. Pat. No. 4,557,245 by permitting shifting movement of the support blocks with respect to a base surface, for selective, continuous and random placement along the longitudinal extent of the guide rail, and in which the connection between the guide rail and the support blocks is compact, easy to loosen and readjust, while being resistant to twisting forces, torques and the like, and in which support blocks can readily be arranged beneath the guide rail, so that a cutter apparatus, which is heavy and bulky, can ride on the elongated guide rail.

Briefly, the elongated guide rail is formed along the length thereof with an attachment base, and the support blocks include a clamping arrangement selectively engageable, in clamped or unclamped condition, with the attachment base. This permits unclamping the support block from the attachment base, sliding it longitudinally along the rail, and the reattaching it to the attachment base.

In accordance with a preferred feature of the invention, and to provide an especially good and sturdy support, the attachment base and the support block are formed with respectively interengaging projection-and-recess means, for example a dovetail connection, in combination with a clamping arrangement. The dovetail connection includes a clamping jaw, which can be loosened or clamped, for example by a clamping screw. This clamping arrangement is particularly compact, and resistant to torque and twisting forces which may be transferred from a saw blade cutting apparatus or other cutting apparatus riding on the elongated support rail to the support blocks.

DRAWINGS

DETAILED DESCRIPTION

The guide rail 1 is preferably made of high-strength steel, formed as a circumferentially closed tube or pipe or closed box structure. A group of guide rails 1 can be joined together axially, i.e. end-to-end. A cutting apparatus, schematically only shown at C, is seated on the guide rail 1. The cutter apparatus is coupled to a cutting blade B, as schematically shown, and as described in detail in the referenced U.S. Pat. No. 4,557,245, Bierei. The cutter apparatus is used to form longitudinal slots or cutting slits, for example in concrete walls, in rocks or the like. The guide rail 1 is formed in longitudinal direction with guide grooves 2 which receive, as schematically shown at G, matching guide elements, for example slider elements, rollers or the like, fitting into the guide grooves 2. The cutter apparatus C can be moved and locked in position, longitudinally of the guide rail 1, by engagement with a rack 3, formed on the upper side of the guide rail 1.

Figure 1:
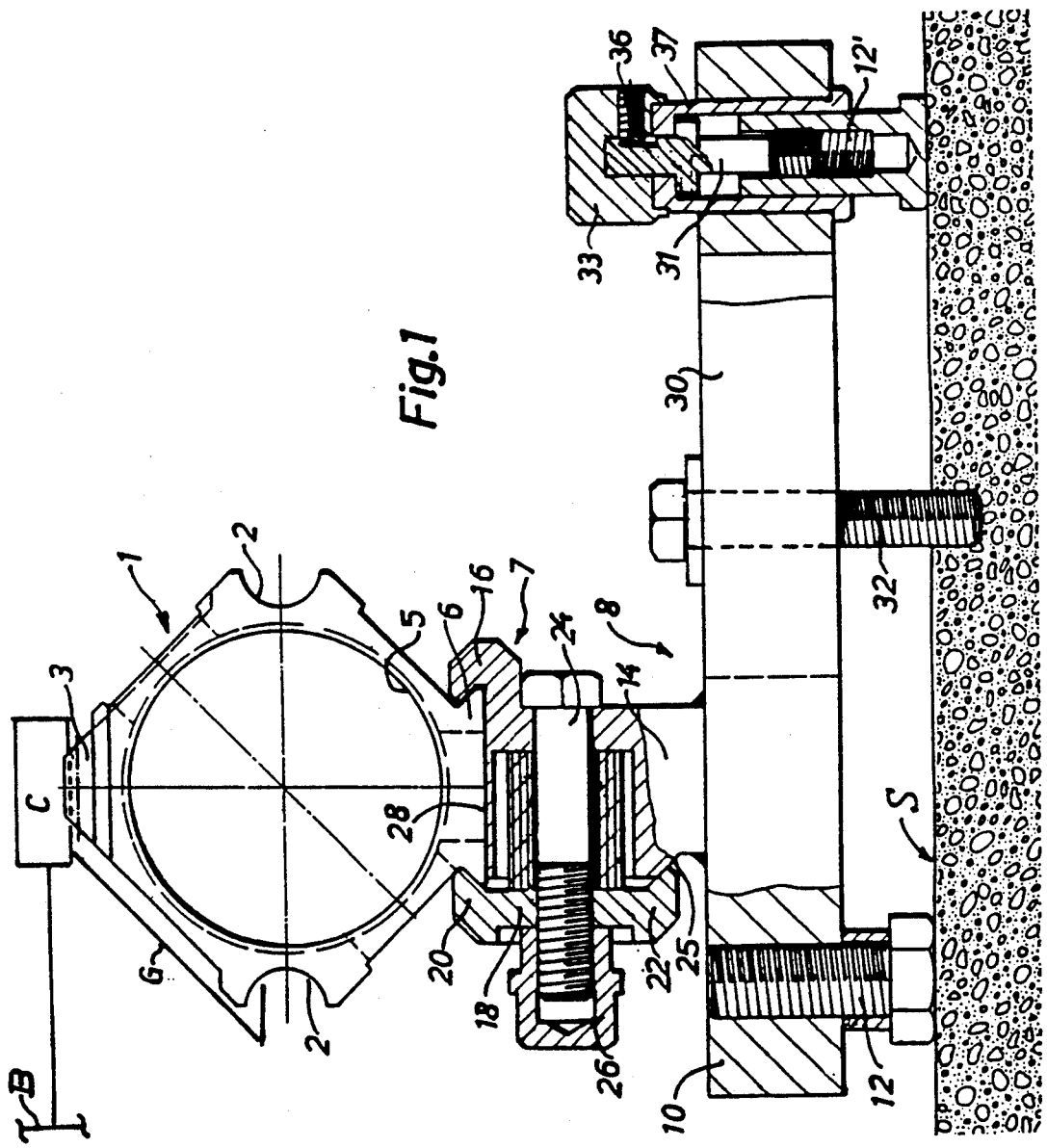
FIG. 1 is a highly schematic longitudinal cross-sectional view through a guide rail, and, in part sectional view, through a support block, and showing the supported apparatus only schematically in block form.

Preferably, the guide grooves 2 are located in a horizontal plane, as which in FIG. 1. Rather than using grooves, projecting rail elements may be used, fitting within matching guide portions extending from or forming part of the apparatus C, for example rollers, slide elements or the like. The race 3 preferably is an integral part of the guide rail 1, for example being cut into a top portion thereof, so that the guide rail 1 forms an integral unitary structural element. Of course, it is equally possible to construct the rack 3 as a separate element, for connection with the rail 1. The rail 1, preferably, is hollow, as seen at 5, so that coupling elements can be introduced into the rail, for coupling together, end-to-end, axially, a plurality of rail sections; they can be clamped in position by clamping elements introduced through a lateral opening, as schematically shown in FIG. 1.

The guide rail 1 is supported above a base surface 5 by a support block 8.

In accordance with the present invention, the guide rail 1 and the support block 8 are coupled together by an attachment base 6 and a clamping arrangement 7, in which the attachment base 6 is unitary with the elongated rail 1, and the clamping arrangement 7 forms part of the support block 8. The coupling between the support block 8 and the rail is effected by an interengaging projection-and-recess arrangement, preferably a dual dovetail coupling. As seen in FIG. 1, the dovetail base 6 is diametrically opposite the rack 3, and is in selectively clamped engagement with a holding portion forming a clamping arrangement 7, and part of the support block 8.

The support block 8 includes a base plate 10, in which at least two height-adjustable positioning screws, 12, 12' are located. Rather than using a plate, other arrangements, for example U-shaped support brackets or the like may be used. The base plate 10 has a clamping block 14 rigidly secured thereto, for example by welding. The clamping block 14 has one inclined surface which engages against an inclined surface of one side of the dovetail base 6 of the attachment base; on the opposite side, a movable clamping plate 18 is provided which, with its upper clamping portion 20, engages against the opposite inclined surface of the dovetail base 6. A lower clamping portion 22 engages behind an inclined surface 25 of the block 14, so that between the two jaws 16, 18, the the rail 1 can be clamped in selected position. A bolt 24, with a nut 26 screwed thereon, is used to tighten the movable jaw 18 and its portions 20, 22 on the attachment base 6 and on the block 14. The base surface of the attachment base 6 will engage a similar flat counter surface 28 on the clamping block 14.

Loosening the nut 26 permits moving the entire support block 8 longitudinally with respect to the guide rail 1, without steps, and as determined by the configuration of the support surface S which, for simplicity, is shown flat in the drawing.

An attachment screw 32 can be provided to attach the support block 8 on the surface S. The screw or bolt 32 passes through an opening 30 in the base plate 10.

The position of the base plate 10, and hence the position of the guide rail 1 with respect to the surface S, can be adjusted by turning an adjustment or coupling bolt 12. In accordance with a preferred feature of the invention, at least one of the adjustment bolts are formed as a support bolt 12'. The support bolt 12' does not rotate with respect to the surface S. The support bolt 12' has a spindle 31 which is in engagement with an operating head 33. The spindle 31 and the operating head 33 are securely coupled together by a coupling pin or a set screw 36. The support bolt 12', itself, is longitudinally slidable in a retention sleeve 37, and prevented from rotation with respect thereto, for example, by a spline within grooves formed in the bolt 12' and the sleeve 37, respectively, as well known.

Preferably, at least two support blocks 8 are provided for each section of guide rail 1.

Figure 2:
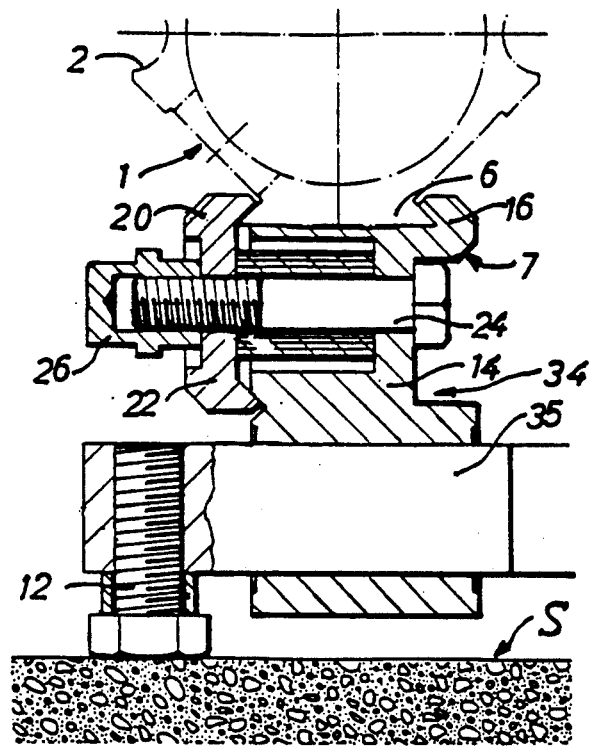
FIG. 2 is a fragmentary longitudinal cross section illustrating another embodiment of the support block.
Figure 3:
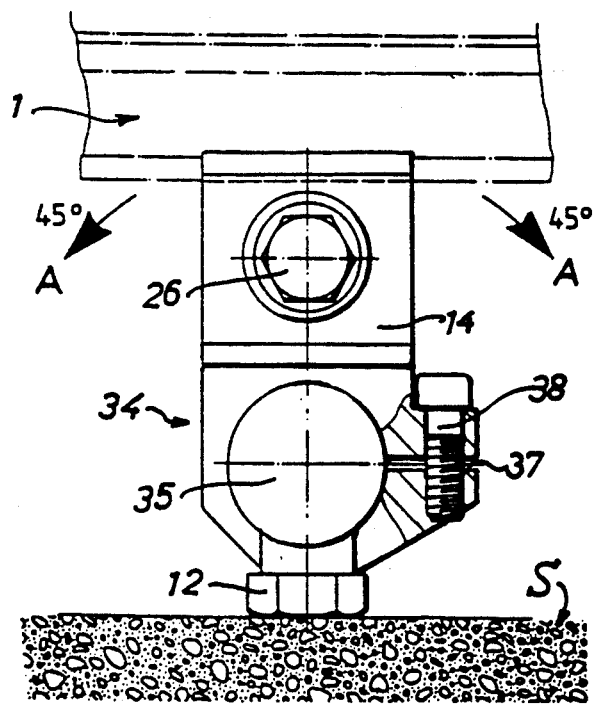
FIG. 3 is a side view of the support block of FIG. 2.

FIGS. 2 and 3 illustrate another embodiment of the invention with a support block 34, seated on a cylindrical element, or rod 35, rather than on a plate 10. The support block 34 is formed with a separating slit 37 and a side flange through which a bolt 38 with a screw thread can be passed. This arrangement permits tilting the support block 34 as schematically shown by the arrows A, for example to an angle of up to 45°. Upon tightening of the bolt 38, the block 34 will be clamped about the rod or cylindrical element 35, which may also be tubular. Thus, the guide rail 1, besides being movable in axial direction with respect to the support block, can also be tilted from an upright position shown in FIGS. 2 and 3 to the tilted position in accordance with the arrows A. The upper portion of the support block 34, together with the clamping arrangement 7, is similar to that described in connection with block 14 of FIG. 1.

Various changes and modifications may be made, and any features described herein may be used with any of the others, within the scope of the invention.

I claim:

1. Support structure system for a concrete and rock cutting apparatus,
   wherein the cutting apparatus includes
   a cutting device (C, B),
   an elongated rail (1), and
   guide means on said rail and cutting device, operatively coupled together, for supporting and guiding the cutting device for movement along said rail; and
   wherein said support structure system includes
   a support block means (8, 34) for attaching said elongated rail (1) to a base surface (S), and
   wherein, in accordance with the invention,
   the rail (1) is formed with a unitary base (6) for engagement with the support block means (8, 34);
   interengaging projection-and-recess means are provided, coupling and interlocking the base (6) to the support block means (8, 34);
   the support block means includes a clamping block (14) and clamping means, selectively engageable in clamped or unclamped condition with said interengaging projection-and-recess means of the base (6) and slidable longitudinally with respect to said elongated rail for permitting longitudinal positioning of said support block means (8, 34) along said rail and subsequent clamping thereto in selected positions along the rail;
   wherein said clamping means comprises two clamping jaws (16, 20) fitting above and around said interengaging projection-and-recess means,
   one of said clamping jaws having an upper jaw portion (20) and a lower jaw portion (22),
   said upper clamping jaw portion being engageable with said interengaging projection-and-recess means on said base (6) and said lower clamping jaw portion being engageable with said clamping block (14) for selectively, releasably, clamping the interengaging projection-and-recess means and hence said base (6) to said clamping block in a selected position along said rail; and
   clamping bolt means (24) penetrating said clamping block, engaging at least two of said clamping jaws, and clamping said jaws against the clamping block and said base (6).

2. The support structure system of claim 1, wherein said interengaging projection-and-recess means comprises a dovetail connection, wherein, respectively, said base is formed with one dovetail element and said clamping block with an interfitting, interlocking second dovetail element engaging said one dovetail element,
   said upper clamping jaw portion being engageable with one of said dovetail elements and said lower clamping jaw portion being engageable with the other of said dovetail elements, said bolt means (24) clamping said jaws against the dovetail elements.

3. The support structure system of claim 1, wherein said interengaging projection-and-recess means comprises a dovetail connection.

4. The support structure system of claim 1, wherein said support block means comprises a cylindrical element (35) and a hollow clamping block (34) surrounding said cylindrical element (35), and circumferential clamping means (38) are provided for clamping said clamping block (34) about said cylindrical element (35).

5. The support structure system of claim 4, wherein said interengaging projection-and-recess means comprises a dovetail connection.

6. The support structure system of claim 5, wherein said interengaging projection-and-recess means comprises a dovetail connection.

7. The support structure system of claim 5, wherein said interengaging projection-and-recess means comprises a dovetail connection, wherein, respectively, said base is formed with one dovetail element and said clamping block with an interfitting, interlocking second dovetail element engaging said one dovetail element,
   said upper clamping jaw portion being engageable with one of said dovetail elements and said lower clamping jaw portion being engageable with the second dovetail element, said bolt means (24) clamping said jaws against the dovetail elements.

8. The support structure system of claim 4, wherein said interengaging projection-and-recess means comprises a dovetail connection, wherein, respectively, said base is formed with one dovetail element and said clamping block with an interfitting, interlocking second dovetail element engaging said one dovetail element,
   said upper clamping jaw portion being engageable with one of said dovetail elements and said lower clamping jaw portion being engageable with the second dovetail element, said bolt means (24) clamping said jaws against the dovetail elements.

9. The support structure system of claim 1, wherein said support block means (8, 34) further comprises as base body (10, 35), and at least one adjustable bolt (12') projecting from the base body towards said base surface (S);
   an adjustment spindle (31) is provided for adjusting the axial position of said adjustable bolt (12) with respect to said base body (10, 35) from a side remote from said base support (S); and
   further including an operating head (33) coupled to said spindle (31) and positioned opposite said base surface (S).

10. The support structure system of claim 9, wherein said interengaging projection-and-recess means comprises a dovetail connection.

11. The support structure system of claim 9, wherein said interengaging projection-and-recess means comprises a dovetail connection, wherein, respectively, said base is formed with one dovetail element and said clamping block with an interfitting, interlocking second dovetail element engaging said one dovetail element,
   said upper clamping jaw portion being engageable with one of said dovetail elements and said lower clamping jaw portion being engageable with the second dovetail element, said bolt means (24) clamping said jaws against the dovetail elements.

12. The support structure system of claim 9, wherein said interengaging projection-and-recess means comprises a dovetail connection.

* * * * *